United States Patent [19]

Oberle

[11] Patent Number: 4,755,402

[45] Date of Patent: Jul. 5, 1988

[54] THERMOPLASTIC MULTI-LAYER BARRIER PACKAGING FILM AND BAGS MADE THEREFROM

[75] Inventor: Timothy T. Oberle, Duncan, S.C.

[73] Assignee: W. R. Grace & Co., Cryovac Div., Duncan, S.C.

[21] Appl. No.: 21,113

[22] Filed: Mar. 3, 1987

[51] Int. Cl.$^4$ .................. B65D 65/02; B32B 27/34
[52] U.S. Cl. .................. 428/35; 264/210.7; 264/211.12; 264/230; 428/474.4; 428/475.5; 428/518
[58] Field of Search .......... 428/349, 475.8, 476.1, 428/518, 475.5, 474.4, 35; 264/210.7, 211.12, 230

[56] References Cited

U.S. PATENT DOCUMENTS

| 4,438,180 | 3/1984 | Lang et al. | 428/475.8 |
| 4,461,808 | 7/1984 | Mollison | 428/475.8 |
| 4,501,798 | 2/1985 | Koschak et al. | 428/349 |
| 4,640,852 | 2/1987 | Ossian | 428/475.8 |
| 4,683,170 | 7/1987 | Tse et al. | 428/475.8 |

FOREIGN PATENT DOCUMENTS

| 0062800 | 10/1982 | European Pat. Off. | 428/475.8 |
| 1290049 | 12/1986 | Japan | 428/475.8 |

Primary Examiner—John E. Kittle
Assistant Examiner—James J. Seidleck
Attorney, Agent, or Firm—John J. Toney; William D. Lee, Jr.; Jennifer L. Skord

[57] ABSTRACT

Disclosed is a multi-layer heat-shrinkable (oriented) film having a barrier layer of polyvinylidene chloride copolymer and having an outer layer of polyamide. The polyamide layer is directly adhered to the barrier layer. Also disclosed is a method to make the film and barrier bags made therefrom.

15 Claims, No Drawings

THERMOPLASTIC MULTI-LAYER BARRIER PACKAGING FILM AND BAGS MADE THEREFROM

BACKGROUND OF THE INVENTION

The invention relates to thermoplastic multi-layer barrier packaging films and bags or pouches made therefrom. In particular, this invention relates to films and bags having heat shrink and cold seal properties, that give good seal strength and wherein the outer layer comprises nylon directly adhered to a barrier layer comprising a polyvinylidene chloride copolymer.

Shrinkable and heat sealable thermoplastic barrier films are being used in the packaging of non-food products as well as the packaging of food products such as meat, cheese, poultry and the like.

A laminate film known from U.S. Pat. No. 3,741,253 comprises a core layer of a vinylidene chloride copolymer (i.e. saran, a well known barrier material) between a layer of a cross-linked ethylene-vinyl acetate copolymer (EVA) used as an inner sealant layer and an outer layer of ethylene-vinyl acetate copolymer which is not cross-linked.

As disclosed in U.S. Pat. No. 4,064,296 the core layer may also be a hydrolized ethylene-vinyl acetate copolymer (EVOH). EVOH is also known as vinyl alcohol polymer and is commercially available from Kuraray Company of Japan as EVAL. It has oxygen barrier properties similar to those of saran, i.e. copolymers of polyvinylidene chloride (PVDC), and offers the advantage that it may be irradiated without discoloration.

Many attempts have been made with barrier films to combine good shrink properties with satisfactory strength, toughness, and sealability while simplifying processing and saving processing costs by eliminating adhesive interlamination between a pair of adjacent layers. Nylon is known for its toughness. When one of the layers of a barrier film is an EVOH barrier material and another is nylon, it is already known from U.S. Pat. No. 4,355,721 (1982) (assignee: American Can) that EVOH directly adheres well to nylon. This patent relates to a heat sealed package for commercial sterilization and unrefrigerated storage of food products wherein the multilayer polymeric material of the package has an interior oxygen barrier layer consisting essentially of a vinyl alcohol polymer which is essentially free of acetal groups. Furthermore, that nylon directly adhered to EVOH may be employed in a heat shrinkable (oriented film) is also known from U.S. Pat. No. 4,501,798 (1985) (assignee: American Can). But there is still room for improvement in having a pair of adjacent layers in direct contact with each other when one layer comprises nylon (also herein referred to as polyamide, sometimes abbreviated as PA) and the other barrier layer comprises a polyvinylidene chloride copolymer.

As is discussed in copending U.S. Ser. No. 911,936, commonly assigned to W. R. Grace and Co., filed Sept. 26, 1986, the disclosure of which is incorporated herein by reference, more recently low density linear polyethylenes have become commercially available and have also been proposed for packaging applications. Actually the so called linear low density polyethylenes are copolymers of ethylene and varying amounts of higher alpha-olefins with e.g. 5 to 10 carbon atoms per molecule (U.S. Pat. No. 4,076,698) or 3 to 8 carbon atoms per molecule (published European patent application No. 120503). Depending on their density these materials are referred to as linear low density polyethylene (LLDPE) or very low density polyethylene (VLDPE), the separation line being at a density of about 0.910 g/cm$^3$. Some properties of VLDPE have been described in Plastics Technology, September 1984, page 113 and October 1984, page 13 as well as in a company brochure published in February 1984 by DSM in the Netherlands and entitled "Stamilex PE". Their properties are said to be a unique combination between those of standard polyethylene and polyolefinic rubbers. Their sealability and their compatibility with other polymers has been mentioned.

The gist of U.S. Ser. No. 911,936 is to provide a material combining improved shrinkability, increased maximum shrink temperature, good cold seal strength and sealability through contamination. This is achieved by a thermoplastic multi-layer barrier packaging film having an inner heat sealing layer comprising a copolymer of ethylene and x to y% by weight, based on the copolymer, of an alpha-olefin with 4 to 8 carbon atoms, whereby $x = 0.5 n_C + 8$ and $y = 1.25 \, n_C + 15$ with $n_C$ being the number of carbon atoms in the alpha-olefin, said copolymer having a density of less than 0.920 g/cc. Preferably the inner heat sealing layer comprises a copolymer of ethylene and 12 to 20% by weight, based on the copolymer, of an alpha-olefin with 4 to 8 carbon atoms. Although in terms of domination, the scope of the claimed invention in U.S. Ser. No. 911,936 would not exclude a PVDC layer directly adhered to a nylon layer, the laboratory Examples of U.S. Ser. No. 911,936 wherein the outside layer comprises polyamide (PA) (reproduced below as a Comparative Example) always show the PA adhered to the adjacent oxygen barrier PVDC layer with an adhesive, namely acid modified EVA. Therefore, what is positively taught is use of an adhesive. It has been surprisingly found by the present inventor that the nylon "outside" layer embodiment of the films according to U.S. Ser. No. 911,936, which films have the improved properties mentioned above because of the "inner" heat sealing layer being a linear copolymer of ethylene and alpha-olefin having a density less than about 0.920 g/cm$^3$, can be made without the need for the acid-modified EVA adhesive to provide inter layer adherence between the PA layer and the PVDC barrier layer. Moreover, other barrier films wherein the "inner" sealing layer is other than that according to U.S. Ser. No. 911,936, (for instance, sealing layers of other materials such as an inner layer of EVA, an inner layer of LLDPE having a density greater than 0.920, etc.) can be made in accordance with the present invention having an outer layer comprising nylon wherein the nylon is directly adhered to the adjacent PVDC barrier layer without the need for any adhesive therebetween.

SUMMARY OF THE INVENTION

Therefore, it is an object of the present invention to provide a multi-layer, thermoplastic PVDC barrier packaging film and bags made therefrom wherein the outer layer comprises nylon, and said outer layer is directly adhered to the PVDC barrier layer. It is an advantage of the invention that such films and bags made therefrom can be manufactured more cheaply and simply due to the elimination of an adhesive for inter layer adherence. Thus, it is also an object of the present invention to provide a process for making multi-layer, thermoplastic barrier films and bags therefrom, having an outer layer comprising nylon, wherein the process involves directly adhering the nylon layer to the PVDC barrier layer. Nylon is not only tough, but also it is glossier and stiffer than a conventional outside layer of EVA. Thus it is an advantage of the present invention, when the film is used for packaging meat, that the package is strong and also that the package has good eye appeal due to both the glossiness being appealing and the stiffness helping to disperse purge from the meat.

Accordingly, the present invention provides a multi-layer heat-shrinkable (oriented) film comprising a barrier layer of polyvinylidene chloride copolymer and an outer layer of polyamide, said polyamide layer being directly adhered to the barrier layer and said polyamide having a melting point below about 160° C.

The invention also provides a process for manufacturing a multi-layer heat-shrinkable (oriented) film having a barrier layer of polyvinylidene chloride copolymer, said process comprising (a) extruding a polyamide layer and the barrier layer such that the polyamide layer is directly adhered to the barrier layer, wherein said polyamide has a melting point below about 160° C., (b) orienting the film in at least one direction, and (c) recovering the multi-layer film.

DETAILED DESCRIPTION

The films of the present invention are in general of the structure: PVDC barrier layer/nylon layer (outside), and in the preferred embodiments are of the structure: (inner) sealing layer/interior layer(s)/PVDC barrier layer/nylon layer(outside).

The polyamides employed in the outer layer of the films of this invention are well known in the art and embrace those resins commonly designated as nylons. Suitable polyamides for purposes of the invention must have a melting point below about 320° F. about (about 160° C.). By using a nylon copolymer with such a melting point, it is possible to coextrude a nylon and a PVDC in adjacent layers with an unmodified die, which normally coextrudes EVA and PVDC. No special die modifications are needed to isolate thermally the PVDC, which will degrade if exposed to excessive temperatures. A major capital investment savings can be realized by not adding an additional adhesive layer and by not replacing existing dies.

Typically, in the conventional method of making polyamide resins, some polyamides are made by condensation of equimolar amounts of a saturated dicarboxylic acid containing from about 2 to 10 carbon atoms with an alkylene diamine, in which the alkylene group contains from about 2 to 10 carbon atoms. Excess diamine may be used, thereby giving an excess of amine end groups over carboxyl end groups in the polyamide. Other polyamide resins are polymerized by addition reactions of ring compounds that contain both acid and amine groups on the monomer. Suitable polyamides include an almost unlimited assortment of nylon copolymers or terpolymers which will have a sufficiently low melting point for extrusion with PVDC according to the present invention. It is also possible to use in this invention polyamides prepared by the copolymerization or terpolymerization of the polymers or their components. A very desirable nylon is the polycondensation product of hexamethylene-tetramine and a 12-carbon dibasic acid (nylon 6/12), and one that is commercially available is Grilon CA6E which is a nylon 6/12 copolymer wherein the nylon 6 is present in a weight amount of about 60% and the nylon 12 is present in a weight amount of about 40%. It has a melting point of about 135°–145° C. and is supplied by Emser.

The polyamide may be blended with a minor amount of an adhesive, typically about 10% or less by weight adhesive. Adhesives are further discussed in the "DEFINITIONS" below.

Typically, in the manufacture of films, a suitable polymer usually in the form of pellets or the like, is brought into a heated area where the polymer feed is melted and heated to its extrusion temperature and extruded as a tubular "blown bubble" through an annular die. Other methods, such as "slot die" extrusion wherein the resultant extrudate is in planar, as opposed to tubular, form are also well known. If heat shrinkable film is desired, then after extrusion, the film is typically cooled and stretched, i.e. oriented by "tenter framing" or by inflating with a "trapped bubble", to impart the heat-shrinkable property to the film, as is further described below. High energy irradiation, typically via an electron beam, preferably takes place prior to the stretching for orienting the film. However, for the present invention, such irradiation is not necessary since a very suitable packaging film is obtained without irradiation. Below, first is described in detail the general process for making and orienting film. The irradiation is described in detail.

More particularly, the manufacture of shrink films may be generally accomplished by extrusion (single layer films) or coextrusion (multi-layer films) of thermoplastic resinous materials which have been heated to or above their flow or melting point from an extrusion or coextrusion die in, for example, either tubular or planar (sheet) form, followed by a post extrusion cooling. The stretching for orientation may be conducted at some point during the cool down while the film is still hot and at a temperature within its orientation temperature range, followed by completing the cooling. Alternatively, after the post extrusion cooling, the relatively thick "tape" extrudate is then reheated to a temperature within its orientation temperature range and stretched to orient or align the crystallites and/or molecules of the material. The orientation temperature range for a given material or materials will vary with the different resinous polymers and/or blends thereof which comprise the material. However, the orientation temperature range for a given thermoplastic material may generally be stated to be below the crystalline melting point of the material but above the second order transition temperature (sometimes referred to as the glass transition point) thereof. Within this temperature range, the material may be effectively oriented.

The terms "orientation" or "oriented" are used herein to describe generally the process steps and resultant product characteristics obtained by stretching, transversely, longitudinally, or both (whether during the post extrusion cool down or during reheating after the post extrusion cool down as described in the paragraph above) and substantially immediately cooling a resinous thermoplastic polymeric material which has been heated to a temperature within its orientation temperature range so as to revise the intermolecular configuration of the material by physical alignment of the crystallites and/or molecules of the material to improve certain mechanical properties of the film such as, for example, shrink tension and orientation release stress. Both of these properties may be measured in accordance with ASTM D 2838-81. When the stretching force is applied in one direction, monoaxial orientation results. When the stretching force is simultaneously applied in two directions, biaxial orientation results. The term oriented is also herein used interchangeably with the term "heat-shrinkable" with these terms designating a material which has been stretched and set by cooling while substantially retaining its stretched dimensions. An oriented (i.e. heat-shrinkable) material will tend to return to its original unstretched (unextended) dimensions when heated to an appropriate elevated temperature.

Returning to the basic process for manufacturing film as discussed above, it can be seen that the film, once extruded (or coextruded if it is a multi-layer film), is then oriented by stretching within its orientation temperature range. The stretching to orient may be accomplished in many ways such as, for example, by "trapped bubble" techniques or "tenter framing". These processes are well known to those in the art and refer to orientation procedures whereby the material is stretched in the cross or transverse direction (TD) and/or in the longitudinal or machine direction (MD). After being stretched, the film is quickly cooled while substantially retaining its stretched dimensions to cool the film rapidly and thus set or lock-in the oriented molecular configuration.

The film which has been made may then be stored in rolls and utilized to package a wide variety of items. If the material was manufactured by "trapped bubble" techniques the material may still be in tubular form or it may have been slit and opened up to form a sheet of film material. In this regard, a product to be packaged may first be enclosed in the material by heat sealing the film to itself where necessary and appropriate to form a pouch or bag and then inserting the product therein. Alternatively, a sheet of the material may be utilized to overwrap the product. These packaging methods are all well known to those of skill in the art.

When a material is of the heat-shrinkable type, then after wrapping, the enclosed product may be subjected to elevated temperatures, for example, by passing the enclosed product through a hot air tunnel. This causes the enclosing heat shrinkable film to shrink around the product to produce a tight wrapping that closely conforms to the contour of the product. As stated above, the film sheet or tube may be formed into bags or pouches and thereafter utilized to package a product. In this case, if the film has been formed as a tube it may be preferable first to slit the tubular film to form a film sheet and thereafter form the sheet into bags or pouches. Such bags or pouches forming methods, likewise, are well known to those of skill in the art.

The above general outline for manufacturing of films is not meant to be all inclusive since such processes are well known to those in the art. For example, see U.S. Pat. Nos. 4,274,900; 4,299,241; 4,194,039; 4,188,443; 4,048,428, 3,821,182 and 3,022,543. The disclosures of these patents are generally representative of such processes and are hereby incorporated by reference.

Alternative methods of producing films of this type are known to those in the art. One well-known alternative is the method of forming a multi-layer film by an extrusion coating in combination with an extrusion or coextrusion process as was discussed above. In extrusion coating a first tubular layer or layers is extruded and thereafter an additional layer or layers is simultaneously or sequentially coated onto the outer surface of the first tubular layer or a successive layer. Exemplary of this method is U.S. Pat. No. 3,741,253. This patent is generally representative of an extrusion coating process and is hereby incorporated by reference.

Many other process variations for forming films are well known to those in the art. For example, conventional thermoforming or laminating techniques may be employed. For instance, multiple substrate layers may be first coextruded via a blown bubble tube with additional layers thereafter being extrusion coated or laminated thereon, or two multi-layer tubes may be coextruded with one of the tubes thereafter being extrusion coated or laminated onto the other.

In the preferred embodiments as illustrated in the examples below, the multi-layer film of the invention contains a barrier layer comprising vinylidene chloride copolymer (saran). The copolymer is a barrier to fluids such as gas. It is further preferred that the barrier copolymer have a melt flow being generally compatible with that of the other components of the multi-layer film, preferably in the range of about 3–10 (melt flow being determined generally in accordance with ASTM D1238). The gas of main concern is oxygen and transmission is considered to be sufficiently low, i.e. the barrier material is relatively gas impermeable, when the transmission rate is below 70 cc/m$^2$/mil thickness/24 hours/atms, as measured according to the procedures of ASTM Method D-1434. The barrier layer of the multi-layer barrier shrink film according to the present invention has a transmission rate below this value.

When, as further discussed below, vinylidene chloride copolymer (PVDC) is employed as the barrier layer, then the irradiation preferably should take place prior to application of the saran layer to avoid degradation thereof. This application may be achieved by well known extrusion coating methods, as discussed above. More particularly, the extrusion coating method of film formation is preferable to coextruding the entire film when it is desired to subject one or more layers of the film to a treatment which may be harmful to one or more of the other layers. Exemplary of such a situation is a case where it is desired to irradiate with high energy electrons one or more layers of a film containing a barrier layer comprised of one or more copolymers of vinylidene chloride (i.e. saran), such as of vinylidene chloride and vinyl chloride or such as of vinylidene chloride and methyl acrylate. Those of skill in the art generally recognize that irradiation with high energy electrons is generally harmful to such saran barrier layer compositions, as irradiation may degrade and discolor saran, making it turn brownish. Thus, if full coextrusion followed by high energy electron irradiation of the multi-layer structure is carried out on a film having a saran layer, the irradiation should be done at low levels with care. Alternatively, this situation may be avoided by using extrusion coating. Accordingly, by means of extrusion coating, one may first extrude or coextrude a first layer or layers, subject that layer or layers to high energy electron irradiation and therefter extrusion coat the saran barrier layer and, for that matter, simultaneously or sequentially extrusion coat other later layers (which may or may not have been irradiated) onto the outer surface of the extruded previously irradiated tube. This sequence allows for the high energy electron irradiative treatment of the first and later layer or layers without subjecting the saran barrier layer to the harmful discoloration effects thereof.

Irradiation may be accomplished by the use of high energy electrons, ultra violet radiation, X-rays, gamma rays, beta particles, etc. Preferably, electrons are employed up to about 20 megarads (MR) dosage level. The irradiation source can be any electron beam generator operating in a range of about 150 kilovolts to about 6 megavolts with a power output capable of supplying the desired dosage. The voltage can be adjusted to appropriate levels which may be for example 1,000,000 or 2,000,000 or 3,000,000 or 6,000,000 or higher or lower. Many apparatus for irradiating films are known to those of skill in the art. The irradiation is usually carried out at a dosage between about 1 MR and about 20 MR, with a preferred dosage range of about 2 MR to about 12 MR. Irradiation can be carried out conveniently at room temperature, although higher and lower temperatures, for example, 0° C. to 60° C. may be employed.

In the Examples below the multi-layer films were made by a conventional method of manufacturing, combining tubular coextrusion (colloquially called the hot blown bubble technique) with extrusion coating to achieve an oriented (heat-shrinkable) film. A tubular process was utilized wherein a coextruded tube of a multi-layer substrate core was extrusion coated with saran and nylon simultaneously, then the resultant structure was cooled and collapsed, and then reheated and biaxially stretched in the transverse direction and in the longitudinal machine direction via inflating the tube with a bubble. Then the stretched bubble was cooled and collapsed, and the deflated film would up as flattened, seamless, tubular film to be used later to make bags, overwrap, et cetera. Prior to the coating of the saran layer and the additional nylon layer, the substrate core was guided through an ionizing radiation field; for example, through the beam of an electron accelerator to receive a radiation dosage in the range of about 1.5 to 4.5 megarads (MR).

Various polymers may be employed for the inner heat sealing layer of the multi-layer barrier films of the present invention. Suitable polymers include, but are not limited to, ethylene vinyl acetate (EVA) copolymers, LLDPE, LDPE, HDPE, MDPE, polypropylene, ethyl acrylic acids, ethylene butyl acrylate (EBA), acid modified EVA, copolymers of an alpha-olefin of the formula $RHC=CH_2$ wherein R is H or $C_1$ to $C_8$ alkyl and an alpha, beta-ethylenically unsaturated carboxylic acid, and the like. Many of these polymers are also suitable for interior layers of the multilayer barrier films of the present invention.

In general, these polymers mentioned in the paragraph above may be blended with each other, and are many of the materials mentioned in the paragraph below, which as per U.S. Ser. No. 911,936 may be blended in a weight amount up to 50%, based on the sealing layer, with the copolymer of ethylene and higher alpha-olefin having a density less than 0.920 g/cc.

When films are made wherein the inner layer is according to U.S. Ser. No. 911,936, the inner sealing layer comprises a copolymer of ethylene and higher alpha-olefin said copolymer having a density less than about 0.920g/cm$^3$. Specifically, when using a copolymer of ethylene and butene (1) the comonomer content should be between about 10 and 20% by weight, based on the copolymer. Such copolymers have a density of less than about 0.915 g/cm$^3$. When employing a copolymer of ethylene and octene (1) the comonomer content should preferably be increased to between about 12 and 25% by weight, based on the copolymer. Such copolymers have a density of less than 0.920 g/cc. It is also possible to blend the ethylene/alpha-olefin copolymer with up to 50% by weight, based on the sealing layer composition, of a polymer which is compatible with said ethylene/alpha-olefin copolymer. Such further polymer may preferably be selected from linear low density polyethylene (LLDPE) with a density above 0.920 g/cc, linear high density polyethylene (LHDPE), low density polyethylene (LDPE), ethylene vinyl acetate (EVA), acid modified EVA, polypropylene, ethylene/propylene copolymers, ionomeric polymers, and ethylene/alkylacrylate (EAA) copolymers wherein the alkyl moiety a has 1 to 8 C atoms, in particular ethylene-methyl-acrylate (EMA), ethylene-ethylacrylate (EEA) and ethylene-butylacrylate (EBA). The ethylene/alkylacrylate copolymer which can be blended with the ethylene/alpha-olefin in the heat sealing layer can comprise about 3 to 30% by weight of alkylacrylate. In order to achieve optimal results as per U.S. Ser. No. 911,936, the comonomer content must increase when going from the $C_4$-alpha-olefin (butene(1)) to the $C_8$-alpha-olefin (octene(1)).

DEFINITIONS

The term "Plexar" as used herein, which Plexar is employed in the films of the invention, refers to families of the Plexar (TM) adhesives commercially available from the Chemplex Company of Rolling Meadows, Ill. Generally, Plexar adhesive is composed of an acid anhydride grafted polyethylene being irradiatively crosslinkable. Plexar adhesives are described in detail in U.S. Pat. Nos. 4,087,587 and 4,087,588. Suitable Plexar adhesive commercially available is Plexar 3382. Another suitable adhesive is CXA 3101. It is an EVA, and is supplied by du Pont.

As used herein the term "extrusion" or the term "extruding" is intended to include coextrusion, extrusion coating, or combinations thereof, whether by tubular methods, planar methods, or combinations thereof.

An "oriented" or "heat shrinkable" material is defined herein as a material which, when heated to an appropriate temperature above room temperature (for example 96° C.), will have a free shrink of about 5% or greater in at least one linear direction.

Unless specifically set forth and defined or otherwise limited, the terms "polymer" or "polymer resin" as used herein generally include, but are not limited to, homopolymers, copolymers, such as, for example block, graft, random and alternating copolymers, terpolymers, etc. and blends and modifications thereof. Furthermore, unless otherwise specifically limited the term "polymer" or "polymer resin" shall include all possible molecular configurations of the material. These structures include, but are not limited to, isotactic, syndiotactic and random molecular configurations.

The term "polyethylene" as used herein, which "polyethylene" is employed in the film of the invention, refers to families of resins obtained by substantially polymerizing the gas ethylene, $C_2H_4$. By varying the comonomers, catalysts and methods of polymerization, properties such as density, melt index, crystallinity, degree of branching, molecular weight and molecular weight distribution can be regulated over wide ranges. Further modifications are obtained by other processes, such as halogenation, and compounding additives. Low molecular weight polymers of ethylene are fluids used as lubricants; medium weight polymers are waxes miscible with paraffin; and the high molecular weight polymers are resins generally used in the plastics industry. Polyethylenes having densities ranging from about 0.900 g/cc to about 0.935 g/cc are called low density polyethylenes (LDPE) while those having densities from about 0.935 g/cc to about 0.940 g/cc are called medium density polyethylenes (MDPE), and those having densities from about 0.941 g/cc to about 0.965 g/cc and over are called high density ethylenes (HDPE). The older, classic low density types of polyethylenes are usually polymerized at high pressures and temperatures whereas the older, classic high density types are usually polymerized at relatively low temperatures and pressures.

The term "linear low density polyethylene" (LLDPE) as used herein, refers to the newer copolymers of a major amount of ethylene with a minor amount of one or more comonomers selected from $C_3$ to about $C_{10}$ or higher alpha-olefins such as butene-1, pentene-1, hexene-1, octene-1, etc. in which the molecules thereof comprise long chains with few side chains or branched structures achieved by low pressure polymerization. The side branching which is present will be short as compared to non-linear polyethylenes. The molecular chains of a linear polymer may be interwined, but the forces tending to hold the molecules together are physical rather than chemical and thus may be weakened by energy applied in the form of heat. Linear low density polyethylene has a density preferably in the range from about 0.911 g/cc to about 0.935 g/cc, more preferably in the range of from about 0.912 g/cc to about 0.928 g/cc for film making purposes. The melt flow index of linear low density polyethylene generally ranges from between about 0.1 to about 10 grams per ten minutes and preferably between from about 0.5 to about 3.0 grams per ten minutes. LLDPE resins of this type are commercially available and are manufactured in low pressure vapor phase and liquid phase processes using transition metal catalysts. LLDPE is well known for its structural strength and anti-stress-cracking properties. Also, very low density linear low density polyethylenes (VLDPE) may be employed, and such have a density from about 0.910 g/cc to about 0.860 g/cc, or even lower.

The term "ethylene vinyl acetate copolymer" (EVA) as used herein refers to a copolymer formed from ethylene and vinyl acetate monomers wherein the ethylene derived units in the copolymer are present in major amounts and the vinyl acetate (VA) derived units in the copolymer are present in minor amounts. EVA is also known for having structural strength, as LLDPE does. For filming forming purposes, it is desirable that the VA content of the EVA be from about 3% to about 25%.

The term "ethylene alkyl acrylate copolymer" (EAA) as used herein refers to a copolymer formed from ethylene and alkyl acrylate wherein the ethylene derived units in the copolymer are present in major amounts and the alkyl acrylate derived units in the copolymer are present in minor amounts. Thus, the term "ethylenemethyl acrylate copolymer" (EMA) as used herein for a type of polyethylene, refers to a copolymer formed from ethylene and methacrylate monomers. The term "ethylene-ethylacrylate copolymer" (EEA) as used herein for a type of polyethylene, refers to a copolymer formed from ethylene and ethyl acrylate monomers. The term "ethylene butyl acrylate copolymer" (EBA) as used herein for a type of polyethylene, refers to a copolymer formed from ethylene and butyl acrylate monomers.

As discussed in more detail above, suitable blends, such as blends of EVA, EMA, EEA, EBA, VLDPE, and LLDPE, may also be advantageously employed in the films of the invention.

Also suitable particularly for the inner sealing layer are materials which are the copolymer of an alpha-olefin having the formula $RHC=CH_2$ wherein R is H or $C_1$ to $C_8$ alkyl and an alpha,beta-ethylenically unsaturated carboxylic acid, which representatively may be one of the Primacor (TM) polymers, supplied by Dow Chemical Company, Midland, Mich. Primacor is produced by the free radical copolymerization of ethylene and a carboxylic acid comonomer therefor such as acrylic acid or methacrylate acid. A very suitable Primacor polymer is Primacor 1410. Also, the copolymer of an alpha-olefin having the formula $RHC=CH_2$ wherein R is H or $C_1$ to $C_8$ alkyl and an alpha, beta-ethylenically unsaturated carboxylic acid may be metal salt neutralized such as with sodium, Na. Thus, the copolymer may be an ionomer. Representatively, such an inomeric material is commercially available as Surlyn (TM) from the E. I. du Pont de Nemours Company of Wilmington, Del., and is described in detail in U.S. Pat. No. 3,355,319 and U.S. Pat. No. 3,845,163.

The following Examples are intended to illustrate the preferred embodiments of the invention and it is not intended to limit the invention thereby.

EXAMPLES

Percentages indicated in the examples are % by weight.

Some of the LLDPE employed in the examples was Dowlex 4002 LLDPE having a melt index of 3.3 and a density of 0.912. It is supplied by Dow Chemical. The comonomer is octene.

Some of the LLDPE employed in the Examples was Dowlex XU 61502.43 LLDPE having a melt index of 3 and a density of 0.915. It is supplied by Dow Chemical. The comonomer is octene.

The VLDPE employed in the examples was XPR-0545-33260-46L having a melt index of 3.3 and a density of 0.907–0.908. The comonomer is octene. It is supplied by Dow Chemical.

The saran employed in some of the laboratory examples was Ixan (TM) WV320 supplied by Solvay Corporation. It is a copolymer of vinylidene chloride with vinyl chloride.

Another saran (denoted in the examples below as saran-MA) employed in some of the laboratory examples was XU32027.01, supplied by Dow Chemical. It is a copolymer of vinylidene chloride with methyl acrylate.

Some of the EVA employed in the laboratory examples was NA 295-00, which is an EVA containing 6% vinyl acetate and having a melt index of 2.6. It is supplied by USI.

Some of the EVA employed in the laboratory examples was LD318.92, which is an EVA containing 9% vinyl acetate and having a melt index of 2.0. It is supplied by Exxon.

The EVA employed in some of the laboratory examples was Elvax 3135X which is an EVA containing 12% vinyl acetate and having a melt index of 0.35. It is supplied by du Pont.

The EVA employed in some of the laboratory examples was LO720.62, which is an EVA containing 18% vinyl acetate and having a melt index of 1.5. It is supplied by Exxon.

The EVA employed in some of the laboratory examples was LD722.62, which is an EVA containing 20% vinyl acetate and having a melt index of 3.0. It is supplied by Exxon.

The nylon employed in the laboratory examples was Grilon CA6E, which is nylon 6/12 copolymer having about 60% nylon 6 and about 40% nylon 12 by weight and having a melting poit of 135°–145° C. It is supplied by Emser.

The films were made by first hot blowing through an annular die a two-layer extruded tube of the structure: LAYER 1/LAYER 2 as the substrate. Then with a two-ply die, a layer of saran and a nylon outer layer was extrusion coated on. The resultant was then cooled and collapsed. The tube was then reheated and oriented by stretching via a trapped bubble 4:1 in the transverse direction and 3:1 in the longitudinal direction for an overall biaxial orientation of 12:1. Where irradiation is indicated in the samples, the two-layer substrate was irradiated at the MR indicated prior to the coating on of saran and nylon.

Several of the samples were measured for gloss, and the results found to be excellent. For those samples tested, the gloss measurements indicated in the Table below were conducted in accordance with ASTM D-2457-70 Test Method.

This tubing was converted into bags using commercial quality bag making machines. The bags were used to package pork products and were vacuumized and sealed on equipment commonly used by the meat industry. The packaged pork had good eye appeal as the packages were glossy. Throughout this process, no problems in outer layer adhesion were encountered. In other words, delamination problems of the nylon directly adhered to the saran were not observed. Good inter layer adherence was achieved without an adhesive.

COMPARATIVE EXAMPLES

Comparative examples from U.S. Ser. No. 911,936 are reproduced here to illustrate the nylon layer being adhered to a PVDC barrier layer with an intermediate layer of adhesive. The multi-layer packaging films of the composition summarized in the following comparative table were produced by conventional techniques, i.e. in a blown-up bubble, so as to obtain a heat shrinkable film. No irradiation was employed in this case.

The materials employed are summarized in the raw materials table below.

TABLE

| SAMPLE NUMBER | SUBSTRATE CORE | | EXTRUSION COATED LAYERS | | IRRAD (MR) | GLOSS (%) |
|---|---|---|---|---|---|---|
| | INNER LAYER 1 | LAYER 2 | BARRIER LAYER 3 | OUTSIDE LAYER 4 | | |
| 1 | EVA (6% VA) | 60% EVA (20% VA) 40% EVA (9% VA) | SARAN | GRILON CA6E | 4.5 | |
| 2 | EVA (6% VA) | EVA (18% VA) | SARAN | GRILON CA6E | 4.5 | |
| 3 | LLDPE 0.912 | 60% EVA (20% VA) 40% EVA (9% VA) | SARAN | 95% GRILON CA6E 5% CXA 3101 ADHESIVE | 4.5 | |
| 4 | EVA (6% VA) | 60% EVA (20% VA) 40% EVA (9% VA) | SARAN | 95% GRILON CA6E 5% CXA 3101 ADHESIVE | 4.5 | |
| 5 | LLDPE 0.912 | 60% EVA (20% VA) 40% EVA (9% VA) | SARAN | 95% GRILON CA6E 5% PLEXAR 3382 ADHESIVE | 4.5 | |
| 6 | LLDPE 0.912 | 60% EVA (20% VA) 40% EVA (9% VA) | SARAN | GRILON CA6E | 4.5 | 94 |
| 7 | VLDPE 0.907 | 60% EVA (20% VA) 40% EVA (9% VA) | SARAN | GRILON CA6E | 4.5 | 96 |
| 8A* | EVA (6% VA) | 60% EVA (20% VA) 40% EVA (9% VA) | SARAN | GRILON CA6E | 4.5 | 91 |
| 8B | EVA (6% VA) | 60% EVA (20% VA) 40% EVA (9% VA) | SARAN | GRILON CA6E | 4.5 | 90 |
| 9 | LLDPE 0.912 | 60% EVA (20% VA) 40% EVA (9% VA) | SARAN-MA | GRILON CA6E | 4.5 | 90 |
| 10 | LLDPE 0.915 | 60% EVA (20% VA) 40% EVA (9% VA) | SARAN-MA | GRILON CA6E | 4.5 | 93 |
| 11 | LLDPE 0.915 | EVA (9% VA) | SARAN-MA | GRILON CA6E | 4.5 | 87 |
| 12 | EVA (6% VA) | EVA (12% VA) | SARAN | GRILON CA6E | 4.5 | |
| 13 | LLDPE 0.912 | 60% EVA (20% VA) 40% EVA (9% VA) | SARAN | GRILON CA6E | 3.0 | |
| 14 | LLDPE 0.912 | 60% EVA (20% VA) 40% EVA (9% VA) | SARAN | GRILON CA6E | 1.5 | |
| 15 | EVA (6% VA) | 60% EVA 20% VA) 40% EVA (9% VA) | SARAN-MA | GRILON CA6E | 4.5 | |
| 16 | LLDPE 0.912 | EVA (18% VA) | SARAN-MA | GRILON CA6E | 4.5 | |
| 17 | LLDPE 0.912 | EVA (9% VA) | SARAN-MA | GRILON CA6E | 4.5 | |

*LAYER 2 had a thicker gauge in 8B than in 8A, and 8B's Saran layer was Ixan B181 instead of Ixan WV320. Otherwise these two films were substantially the same.

RAW MATERIALS TABLE

| ABBREVIATION | COMPOSITION | MELTING POINT | DENSITY (g/cm$^3$) |
|---|---|---|---|
| E (15% B) | ethylene-butene copolym, 25% butene | 118° C. | 0.906 |
| E (8% B) | ethylene-butene copolym, 8% butene | 121.5° C. | 0.918 |
| E (6% VA) | ethylene-vinylacetate copolym, 6% VA | 105° C. | 0.926 |

RAW MATERIALS TABLE-continued

| ABBREVIATION | COMPOSITION | MELTING POINT | DENSITY (g/cm$^3$) |
|---|---|---|---|
| E (9% VA) | ethylene-vinylacetate copolym, 9% VA | 96° C. | 0.929 |
| E (14% VA) | ethylene-vinylacetate copolym, 14% VA | 90° C. | 0.932 |
| E (18% VA) | ethylene-vinylacetate copolym, 18% VA | 91° C. | 0.940 |
| Ionomer (Na) | Ionomeric resin (Na salt) | 90–92° C. | 0.940 |
| E (19% O) | ethylene-octene copolym, 19% octene | 124° C. | 0.911 |
| E (13% O) | ethylene-octene copolym, 13% octene | 124° C. | 0.915 |
| E (10.5% O) | ethylene-octene copolym, 10.5% octene | 123° C. | 0.920 |
| Acid modif. EVA | acid modified Ethylene Vinylacetate | (55° C.) | 0.948 |
| PA | Polyamide (Nylon 6,12 copolymer) | 140–147° C. | 1.06 |
| EMA (20% MA) | ethylene-methylacrylate copolym., 20% MA | 85–90° C. | 0.942 |
| EBA (7% BA) | ethylene-butylacrylate copolym., 7% BA | 98–108° C. | 0.923 |
| P (4.5% E) | propylene-ethylene copolym., 4.5% E | 135° C. | 0.900 |

COMPARATIVE TABLE

| SAMPLE NUMBER | A INNER SEALING LAYER | B LAYER | C ADHESION PROMOTER LAYER | D BARRIER LAYER | E ADHESION PROMOTER LAYER | F OUTER LAYER |
|---|---|---|---|---|---|---|
| Comp 5 | Ionomer (Na) | E/18% VA | acid modif. EVA | PVDC | acid modif EVA | PA |
| Comp 6 | E/8% B | E/18% VA | acid modif. EVA | PVDC | acid modif. EVA | PA |
| 4 | E/15% B | E/18% VA | acid modif. EVA | PVDC | acid modif. EVA | PA |
| 5 | E/13% O | E/18% VA | acid modif. EVA | PVDC | acid modif. EVA | PA |
| 6 | E/19% O | E/18% VA | acid modif. EVA | PVDC | acid modif. EVA | PA |
| 7 | 75% E/13% O 25% EBA | E/18% VA E/14% VA | acid modif. EVA | PVDC | acid modif. EVA | PA |
| 8 | 90% E/13% O 10% acid modif. EVA | E/18% VA E/14% VA | acid modif. EVA | PVDC | acid modif. EVA | PA |
| 9 | 50% E/13% O 50% E/6% VA | E/18% VA E/14% VA | acid modif. EVA | PVDC | acid modif. EVA | PA |
| 10 | 50% E/15% B 50% P/4.5% E | E/18% VA E/14% VA | acid modif. EVA | PVDC | acid modif. EVA | PA |

While certain representative embodiments and details have been shown for the purpose of illustration, numerous modifications to the formulations described above can be made without departing from the invention disclosed.

What is claimed is:

1. A multi-layer heat-shrinkable (oriented) film comprising a barrier layer of polyvinylidene chloride copolymer and an outer layer of polyamide, said polyamide layer being directly adhered to the barrier layer in face to face contact without the use of an intermediate adhesive layer, and said polyamide having a melting point below about 160° C., and wherein said polyvinylidene chloride copolymer and said polyamide have been simultaneously coextruded through an unmodified die.

2. The film of claim 1 wherein said polyamide comprises a nylon 6/12 copolymer.

3. The film of claim 1 wherein said polyamide layer includes about 10% by weight or less of an adhesive.

4. The film of claim 1 having a sealing layer on the side of the barrier layer opposite to the side to which the polyamide layer is adhered.

5. The film of claim 4 wherein said sealing layer comprises a polymer chosen from EVA, LLDPE, LDPE, HDPE, MDPE, VLDPE, polypropylene, EBA, or copolymers of an alpha-olefin of the formula RHC=CH$_2$ wherein R is H or C$_1$ to C$_8$ alkyl and an alpha, beta-ethylenically unsaturated carboxylic acid.

6. A bag formed from the film of claim 1, said bag having end seal(s), side seal(s) or a combination thereof, wherein said polyamide layer is the bag outside.

7. The bag of claim 6 wherein said polyamide comprises a nylon 6/12 copolymer.

8. The bag of claim 6 wherein said polyamide layer includes about 10% by weight or less of an adhesive.

9. The bag of claim 6 having a sealing layer on the side of the barrier layer opposite to the side to which the polyamide layer is adhered.

10. The bag of claim 9 wherein said sealing layer comprises a polymer chosen from EVA, LLDPE, LDPE, HDPE, MDPE, VLDPE, polypropylene, EBA, or copolymers of an alpha-olefin of the formula RHC=CH$_2$ wherein R is H or C$_1$ to C$_8$ alkyl and an alpha,beta-ethylenically unsaturated carboxylic acid.

11. A process for manufacturing a multi-layer heat-shrinkable (oriented) film having a barrier layer of polyvinylidene chloride copolymer, said process comprising (a) extruding a polyamide layer and the barrier layer such that the polyamide layer is directly adhered to the barrier layer in face to face contact without the use of an intermediate adhesive layer, wherein said polyamide has a melting point below about 160° C., and wherein said polyvinylidene chloride copolymer and said polyamide have been simultaneously coextruded through an unmodified die.

(b) orienting the film in at least one direction, and (c) recovering the multi-layer film.

12. The process of claim 11 wherein said polyamide comprises a nylon 6/12 copolymer.

13. The process of claim 11 wherein said polyamide layer includes about 10% by weight or less of an adhesive.

14. The process of claim 11 wherein the extruding in step (a) includes extruding a sealing layer on the side of the barrier layer opposite to the side to which the polyamide layer is directly adhered.

15. The process of claim 14 wherein said sealing layer comprises a polymer chosen from EVA, LLDPE, LDPE, HDPE, MDPE, VLDPE, polypropylene, EBA, or copolymers of an alpha-olefin of the formula RHC=CH$_2$ wherein R is H or C$_1$ to C$_8$ alkyl and an alpha,beta-ethylenically unsaturated carboxylic acid.

* * * * *

UNITED STATES PATENT AND TRADEMARK OFFICE
CERTIFICATE OF CORRECTION

PATENT NO. : 4,755,402

DATED : July 5, 1988

INVENTOR(S) : Timothy T. Oberle

It is certified that error appears in the above-identified patent and that said Letters Patent is hereby corrected as shown below:

In column 14, line 51, delete ".", substituting therefor --,--.

Signed and Sealed this

First Day of November, 1988

Attest:

DONALD J. QUIGG

*Attesting Officer*      *Commissioner of Patents and Trademarks*